United States Patent
Rachapudi et al.

(10) Patent No.: US 10,901,958 B2
(45) Date of Patent: Jan. 26, 2021

(54) ARCHIVE LOG MANAGEMENT FOR DISTRIBUTED DATABASE CLUSTERS

(71) Applicant: NETAPP, INC., Sunnyvale, CA (US)

(72) Inventors: Amarnath Rachapudi, Bangalore (IN); Atish Kathpal, Bangalore (IN); Vineeth Karinta, Fremont, CA (US); Karthikeyan Nagalingam, Morrisville, NC (US); Santosh Ananth Rao, Cupertino, CA (US)

(73) Assignee: NETAPP, INC., Sunnyvale, CA (US)

( * ) Notice: Subject to any disclaimer, the term of this patent is extended or adjusted under 35 U.S.C. 154(b) by 347 days.

(21) Appl. No.: 15/965,127

(22) Filed: Apr. 27, 2018

(65) Prior Publication Data

US 2019/0332692 A1    Oct. 31, 2019

(51) Int. Cl.
*G06F 16/182* (2019.01)
*G06F 11/14* (2006.01)
*G06F 16/907* (2019.01)
*G06F 16/17* (2019.01)

(52) U.S. Cl.
CPC ...... *G06F 16/1844* (2019.01); *G06F 11/1451* (2013.01); *G06F 11/1471* (2013.01); *G06F 16/1734* (2019.01); *G06F 16/907* (2019.01)

(58) Field of Classification Search
CPC .................................................. G06F 16/1844
See application file for complete search history.

(56) References Cited

U.S. PATENT DOCUMENTS

| 10,558,531 | B2  | 2/2020 | Sehgal et al. |
| 10,621,049 | B1* | 4/2020 | Certain ................ G06F 1/10 |
| 2015/0142747 | A1 | 5/2015 | Zou |
| 2016/0057219 | A1 | 2/2016 | Kore et al. |
| 2017/0147602 | A1 | 5/2017 | Darcy et al. |
| 2018/0143884 | A1* | 5/2018 | Brunzema .......... G06F 11/1471 |

OTHER PUBLICATIONS

Hewitt Eben., "Cassandra: The Definitive Guide"; Nov. 2010; O'Reilly Media, Inc.; Sebastopol, California, US, 330 pages.
Notice of Allowance on related (U.S. Appl. No. 15/490,236) dated Nov. 14, 2019.

* cited by examiner

*Primary Examiner* — Kris E Mackes
(74) *Attorney, Agent, or Firm* — Klein, O'Neill & Singh, LLP

(57) ABSTRACT

Methods and systems for a distributed database cluster storing a plurality of replicas of a databases are provided. One method includes locating by a processor, a timestamp of a last stored record in a backup copy of the database from a plurality of logical partitions for a point in time restore operation; identifying by the processor, an operation log for each logical partition with the last stored record, the operation log providing transaction details associated with the database; splitting by the processor, the operation log for each logical partition by ignoring transactions that occurred prior to the timestamp of the last stored record; and using by the processor, the split operation log for restoring the database to the point in time.

20 Claims, 14 Drawing Sheets

Database recovery at T_R(Snapshot 2 + Log File (Split 2) + Split (3))

US 10,901,958 B2

ARCHIVE LOG MANAGEMENT FOR DISTRIBUTED DATABASE CLUSTERS

TECHNICAL FIELD

The present disclosure relates to networked storage systems, and particularly, to archive log management of distributed database clusters.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple users with access to shared data, backing up data and others.

A storage system typically includes at least one computing system executing a storage operating system for storing and retrieving data on behalf of one or more client computing systems ("clients"). The storage operating system stores and manages shared data containers in a set of mass storage devices.

NoSQL databases are commonly used to store information. A NoSQL database may have various replicas that are maintained by different computing nodes in a cluster. The data files and logs, including journal and operation logs are stored at shared storage systems that are managed by the storage operating system.

Backup and restore of distributed databases can be challenging because various computing nodes store the databases. Recovery Point Objective (RPO) and Recovery Time Objective (RTO) are two common parameters typically used for conducting disaster recovery of databases stored by a storage system. RPO provides a maximum amount of time between a last available backup and potential failure point. RPO helps in determining the amount of data that an entity can manage to lose in the event of a failure. RTO defines a maximum amount of time for a data recovery process i.e. the amount of time an entity can afford for data to be unavailable.

Conventional NoSQL database restore techniques for restoring databases from backup copies have shortcomings. For example, to execute a restore operation using a backup copy of a clustered database, a dedicated copy of the entire backup is typically copied to a target cluster. This increases RTO and hence is not desirable. Furthermore, conventional NoSQL database applications limit an amount of operation logs that are collected. This impedes continuous protection of a clustered database.

Continuous efforts are being made to develop better data protection technology for distributed database clusters for efficiently backing up and recovering a database based on a defined point in time.

BRIEF DESCRIPTION OF THE DRAWINGS

The foregoing features and other features will now be described with reference to the drawings of the various aspects. In the drawings, the same components have the same reference numerals. The illustrated aspects are intended to illustrate, but not to limit the present disclosure. The drawings include the following Figures.

DETAILED DESCRIPTION

Figure 1A:
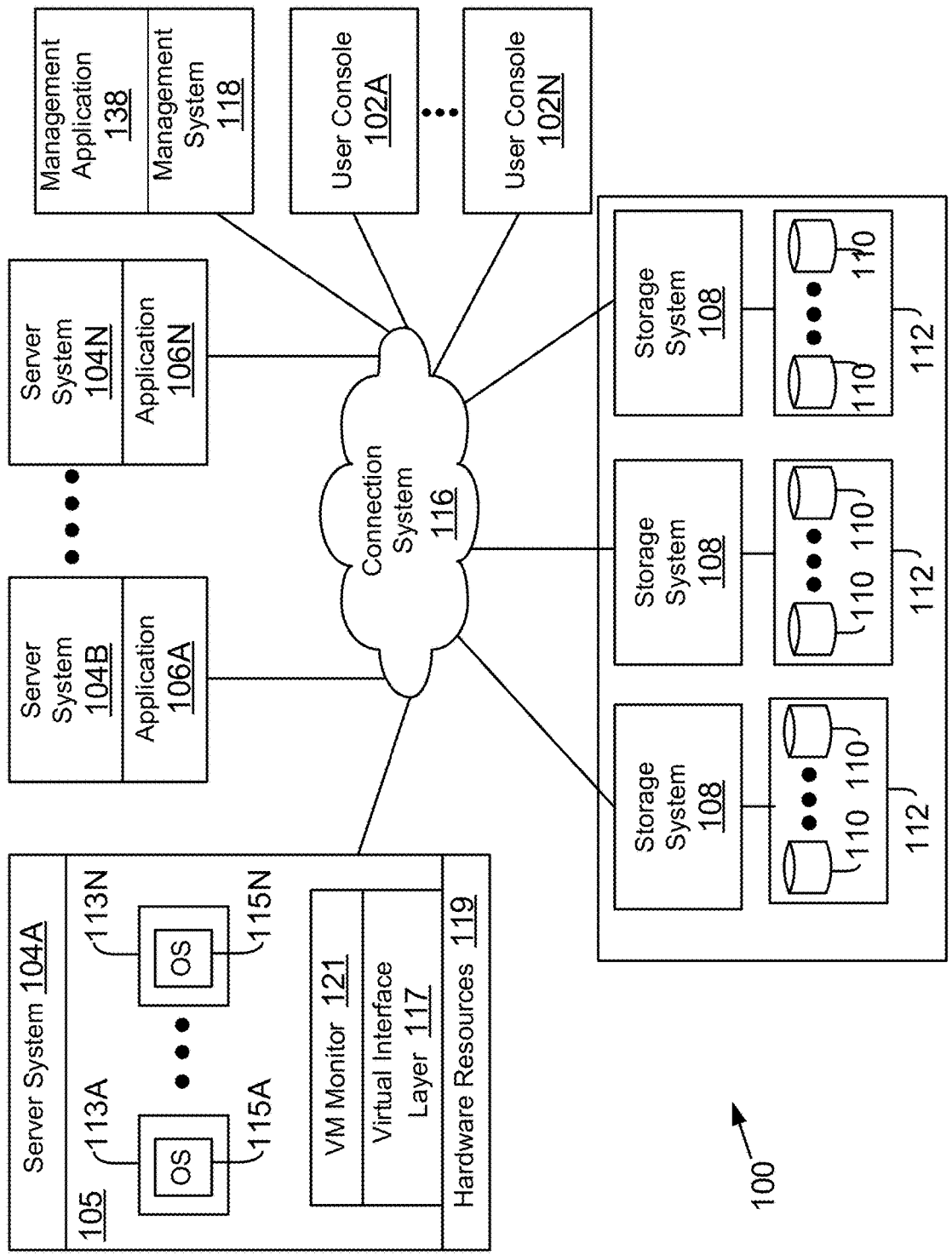
FIG. 1A shows an example of an operating environment for the various aspects of the present disclosure.

As preliminary note, the terms "component", "module", "system," and the like as used herein are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various non-transitory, computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device type, in accordance with the claimed subject matter.

In one aspect, methods and systems for protecting NoSQL databases in a distributed, master-slave, database cluster using innovative computing technology of the present disclosure are provided. A NoSQL database is different from a typical SQL (structured query language) relational database that is based on tabular relations. A NoSQL database uses different data structures to store data compared to SQL databases, for example, key-value pairs (including for example, JSON (Java Script Object Notation) based objects) and others.

NoSQL databases may be managed in a clustered environment where numerous computing nodes manage a replica or copy of the same database using shared storage. The distributed database environment may have a master-slave architecture. Examples of master-slave database applications include the "MongoDB", Oracle NoSQL, MarkLogic, Redis and other similar database applications (without derogation of any third party trademark rights). The examples below are based on MongoDB, provided by MongoDb Inc., a NoSQL database program/application that uses JSON (Java Script Object Notation) like objects to store data in a MongoDB database, however, the various adaptive described herein are not limited to any specific database type.

In a master-slave environment, replication is a process of synchronizing data across multiple database nodes (or servers). Replication provides redundancy and increases data availability with multiple copies of data on different database servers/nodes. As an example, a replica set for a distributed NoSQL database includes multiple instances of the database/database program. In a replica set, a primary copy is managed by a primary computing node (may be referred to as a primary server or primary node) and secondary replicas are managed by secondary computing nodes (may be referred to as secondary nodes or secondary servers). Each node executes an instance of the database program.

The primary node operates as a "master" to store data and metadata for the database. All database write operations and updates flow through the primary node. The database replicas (i.e. the primary and at least one secondary copy) are organized within a shard, where a shard is a "horizontal partition" of the database and managed as a logical structure. Each shard may be held on a separate database server instance, to distribute the load for storing and retrieving data.

A database program may provide built-in backup options but they are not efficient for handling data corruption that can propagate to disaster recovery copies, accidental deletion, security breaches, and/or catastrophic failures.

There are various challenges for backing up and recovering (also referred to as restoring, used interchangeably throughout this application) distributed NoSQL databases. A backup taken by a database application, e.g. a MongoDB application typically involves a dedicated copy of the entire database in a dedicated separate location. The backup typically cannot be used for recovery until the entire database can be copied, referred to as a "copy-out" phase. Recovery based on backup by a database application involves using the dedicated copy of the entire cluster at a target cluster. This increases RTO and hence, is undesirable and may not meet user service level objectives. Furthermore, the database recovery using operation logs provided by the database application may be limited by a recovery time. For example, a MongoDB operation log recovery typically runs at 2 GB per hour, which may increase the RTO for larger databases. Details of operation logs are provided below.

Yet another shortcoming in conventional data protection technology is that operation log collection by a database application may be capped i.e. only a certain amount of operation logs are saved, before a new operation log is written over a previous log. Once the cap is reached, the database application starts a new operation log without notifying the client or keeping the previous log. Therefore, continuous data protection is not available for user data in a conventional distributed database cluster, and instead data protection is limited by the cap size determined by the database application.

In one aspect, innovative technology provided for a master-slave, NoSQL distributed database cluster with continuous archive log management. Operation logs are archived for continuous protection for every shared/replica-set and stored as a separate storage volume to meet lower RPO requirements. As described below in detail, this prevents operation log loss due to log rotation by the database application. The operation log size is based on a RTO requirements and hence can be customized.

In one aspect, point in time backups (i.e. snapshots) of the database cluster are taken and stored by a storage system. Before taking the snapshots, client access to the database is not suspended. Prior to scheduling the snapshots, the technology described herein tails (i.e. retrieves) the operation logs for each shard. The operation logs may be compressed for storage space efficiency. The operation logs may be converted from a first format (e.g. JSON) to a second format (for e.g. BSON (i.e. binary JSON format used by the MongoDB application or any other database application type)).

In one aspect, the operation logs collected between snapshots are of a size that can be replayed within a RTO for a client. The RTO may be based on a service level objective/agreement for the client. Therefore, once the operation log size reaches a certain size beyond which a replay would violate the RTO, a snapshot is immediately taken. For example, assume that an operation log has been collected during X hours between snapshot based full backup. If the operation log reaches a size of Y GB and may take longer than the RTO duration, then a full snapshot of the database cluster is triggered to avoid breaching the RTO. Details regarding the innovative archive log management technology of the present disclosure are provided below.

System 100: FIG. 1A shows an example of a networked operating environment 100 (also referred to as system 100), for implementing the various adaptive aspects of the present disclosure. In one aspect, system 100 may include a plurality of computing systems 104A-104N (may also be referred to and shown as server system (or server systems) 104 or as host system (or host systems) 104) that may access one or more storage systems 108 via a connection system 116 such as a local area network (LAN), wide area network (WAN), the Internet and others. The server systems 104 may communicate with each other via connection system 116, for example, for working collectively to provide data-access service to user consoles (or computing devices) 102A-102N (may be referred to as user 102 or client system 102).

Server systems 104 may be computing devices configured to execute applications 106A-106N (may be referred to as application 106 or applications 106) over a variety of operating systems, including the UNIX® and Microsoft Windows® operating systems. Applications 106 may utilize data services of storage system 108 to access, store, and manage data in a set of storage devices 110 that are described below in detail. Applications 106 may include a database program executed in a master-slave distributed database cluster, for example, the MongoDB application, as described below in detail.

Server systems 104 generally utilize file-based access protocols when accessing information (in the form of files and directories) over a network attached storage (NAS)- based network. Alternatively, server systems 104 may use block-based access protocols, for example, the Small Computer Systems Interface (SCSI) protocol encapsulated over TCP (iSCSI) and SCSI encapsulated over Fibre Channel (FCP) to access storage via a storage area network (SAN).

Server 104A executes a virtual machine environment 105, according to one aspect. In the virtual machine environment 105, a physical resource is time-shared among a plurality of independently operating processor executable virtual machines (VMs). Each VM may function as a self-contained platform, running its own operating system (OS) and computer executable, application software. The computer executable instructions running in a VM may be collectively referred to herein as "guest software". In addition, resources available within the VM may be referred to herein as "guest resources".

The guest software expects to operate as if it were running on a dedicated computer rather than in a VM. That is, the guest software expects to control various events and have access to hardware resources on a physical computing system (may also be referred to as a host platform) which may be referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host platform.

The virtual machine environment 105 includes a plurality of VMs 113A-113N that execute a plurality of guest OS 115A-115N (may also be referred to as guest OS 115) to share hardware resources 119. As described above, hardware resources 119 may include CPU, memory, I/O devices, storage or any other hardware resource.

A virtual machine monitor (VMM) 121, for example, a processor executed hypervisor layer provided by VMWare Inc., Hyper-V layer provided by Microsoft Corporation (without derogation of any third party trademark rights) or any other virtualization layer type, presents and manages the plurality of guest OS 115. VMM 121 may include or interface with a virtualization layer (VIL) 117 that provides one or more virtualized hardware resource 119 to each guest OS. For example, VIL 117 presents physical storage at storage devices 110 as virtual storage (for example, as a virtual hard drive (VHD)) to VMs 113A-113N. The VMs use the VHDs to store information at storage devices 110.

In one aspect, VMM 121 is executed by server system 104A with VMs 113A-113N. In another aspect, VMM 121 may be executed by a separate stand-alone computing system, often referred to as a hypervisor server or VMM server and VMs 113A-113N are presented via another computer system. It is noteworthy that various vendors provide virtualization environments, for example, VMware Corporation, Microsoft Corporation (without derogation of any third party trademark rights) and others. The generic virtualization environment described above with respect to FIG. 1A may be customized depending on the virtual environment provider.

System 100 may also include a management system 118 for managing and configuring various elements of system 100. Management system 118 may include one or more computing systems for performing various tasks described below in detail. Management system 118 may also execute or include a management application 138 that executes the process blocks using the innovative archive log management technology of the present disclosure, described below in detail.

In one aspect, storage system 108 is a shared storage system having access to a set of mass storage devices 110 (may be referred to as storage devices 110) within a storage subsystem 112. As an example, storage devices 110 may be a part of a storage array within the storage sub-system 112. Storage devices 110 are used by the storage system 108 for storing information. The storage devices 110 may include writable storage device media such as magnetic disks, video tape, optical, DVD, magnetic tape, non-volatile memory devices for example, self-encrypting drives, flash memory devices and any other similar media adapted to store information. The storage devices 110 may be organized as one or more groups of Redundant Array of Independent (or Inexpensive) Disks (RAID). The various aspects disclosed herein are not limited to any particular storage device or storage device configuration.

In one aspect, to facilitate access to storage devices 110, a storage operating system of storage system 108 "virtualizes" the storage space provided by storage devices 110. The storage system 108 can present or export data stored at storage devices 110 to server systems 104 and VMM 121 as a storage volume or one or more qtree sub-volume units including logical unit numbers (LUNs). Each storage volume may be configured to store data files (or data containers or data objects), scripts, word processing documents, executable programs, and any other type of structured or unstructured data. From the perspective of the VMS/server systems, each volume can appear to be a single disk drive. However, each volume can represent the storage space in one disk, an aggregate of some or all of the storage space in multiple disks, a RAID group, or any other suitable set of storage space.

It is noteworthy that the term "disk" as used herein is intended to mean any storage device/space and not to limit the adaptive aspects to any particular type of storage device, for example, hard disks.

The storage system 108 may be used to store and manage information at storage devices 110 based on a request generated by server system 104, management system 118, user 102 and/or a VM. The request may be based on file-based access protocols, for example, the CIFS or the NFS protocol, over TCP/IP. Alternatively, the request may use block-based access protocols, for example, iSCSI or FCP.

As an example, in a typical mode of operation, server system 104 (or VMs 113A-113N) transmits one or more input/output (I/O) commands, such as an NFS or CIFS request, over connection system 116 to the storage system 108. Storage system 108 receives the request, issues one or more I/O commands to storage devices 110 to read or write the data on behalf of the server system 104, and issues an NFS or CIFS response containing the requested data over the connection system 116 to the respective server system 104

In one aspect, storage system 108 may have a distributed architecture, for example, a cluster based system that may include a separate network module and storage module, described below in detail with respect to FIG. 2A. Briefly, the network module is used to communicate with server systems 104 and management system 118, while the storage module is used to communicate with the storage devices 110.

Figure 1B:
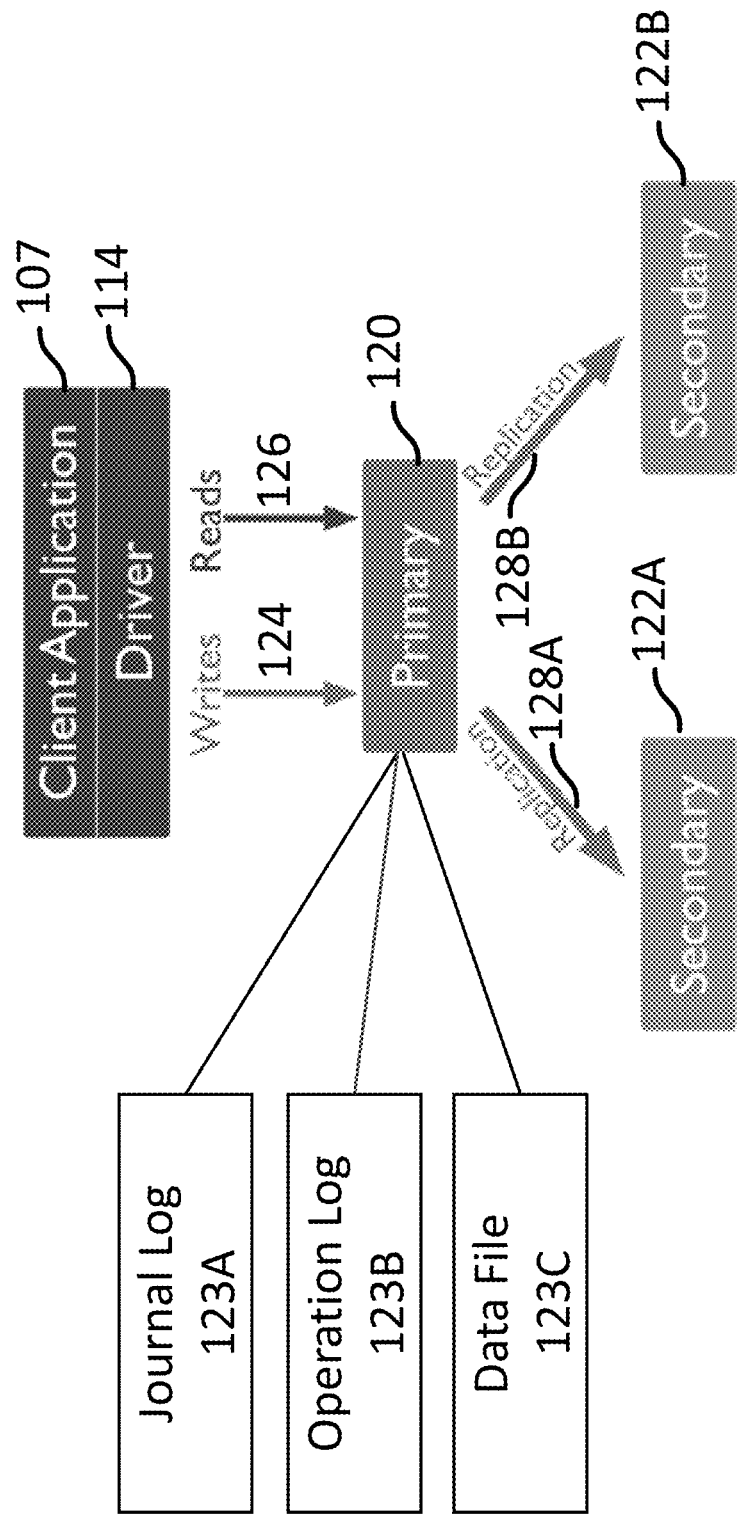
FIG. 1B shows an example of a distributed database, according to one aspect of the present disclosure.

Distributed Database Cluster: FIG. 1B shows a block diagram illustrating a master-slave database environment, for example, a database cluster executing a MongoDB. A client application 107 executed by a computing device (for example, user console 102A) generates write requests 124 and read requests 126. The write requests 124 and the read requests 125 are transmitted by a driver 114 executed by the user console 102A to a primary computing node 120 that executes an instance of the database application (e.g. 106). The data received from the client application 107 is replicated (shown as 128A/128B) to secondary nodes 122A/122B that each execute independent instance of the database program. The primary node 120, the secondary nodes 122A/122B comprise a "replica" of a clustered, distributed database. The primary and secondary nodes are also part of a same "shard" that is uniquely identified and may be executed by separate servers (e.g. 104)/VMs.

When a write request is received, a journal log (123A) entry is first entered. The journal log 123A is typically stored in persistent storage. The journal log 123A includes an address of where data is to be written. An operation log 123B is typically maintained at a cache (not shown) of the primary node 120. The operation log 123B includes details of each operation and the status of each operation. The data file 123C for a write request is also initially stored at the cache of the primary node 120. The cache that stores the operation log 123B and the data file 123C is periodically flushed to persistent storage (e.g. 110, FIG. 1A) after a certain duration (e.g. 60 seconds) or when the cache has reached a certain capacity level.

In one aspect, the operation log 123B stores transaction information for various operations. The operation log 123B has a plurality of entries used for a restore operation operation that meets a client's RTO requirements, as described below in detail.

In one aspect, each operation log 123B entry includes a timestamp ("ts") indicating when a transaction occurred, and an identifier ("h") for the transaction. Each entry also identifies the table/collection name ("ns") for the transaction and the operation type ("op"). The operation type may identify a create operation to create a database entry, an insert operation ("i") for inserting a database entry, an update operation ("u") to update a database entry, and a delete operation ("d") to delete a database entry. Each entry also provides details for each operation ("o") including an object identifier identifying the entry, a unique identifier ("uid") of the entry, and any user supplied fields and values. An example of an operation log 123B entry is provided below, with the values of ts, h, ns, and o values as an example. The various entry values are self-explanatory.
{
    "ts" Timestamp (1371694926000, 1),
    "h": NumberLong ("−8181154083101436940"),
    "OP": "i"
    "ns" "test. events",
    "o": {
        "_id": ObjectId("51C2674e5b82d63c65d0cabe"),
        "uid": 1,
        "Name": "John",
        "Age": 25
    }
}

Figure 1C:
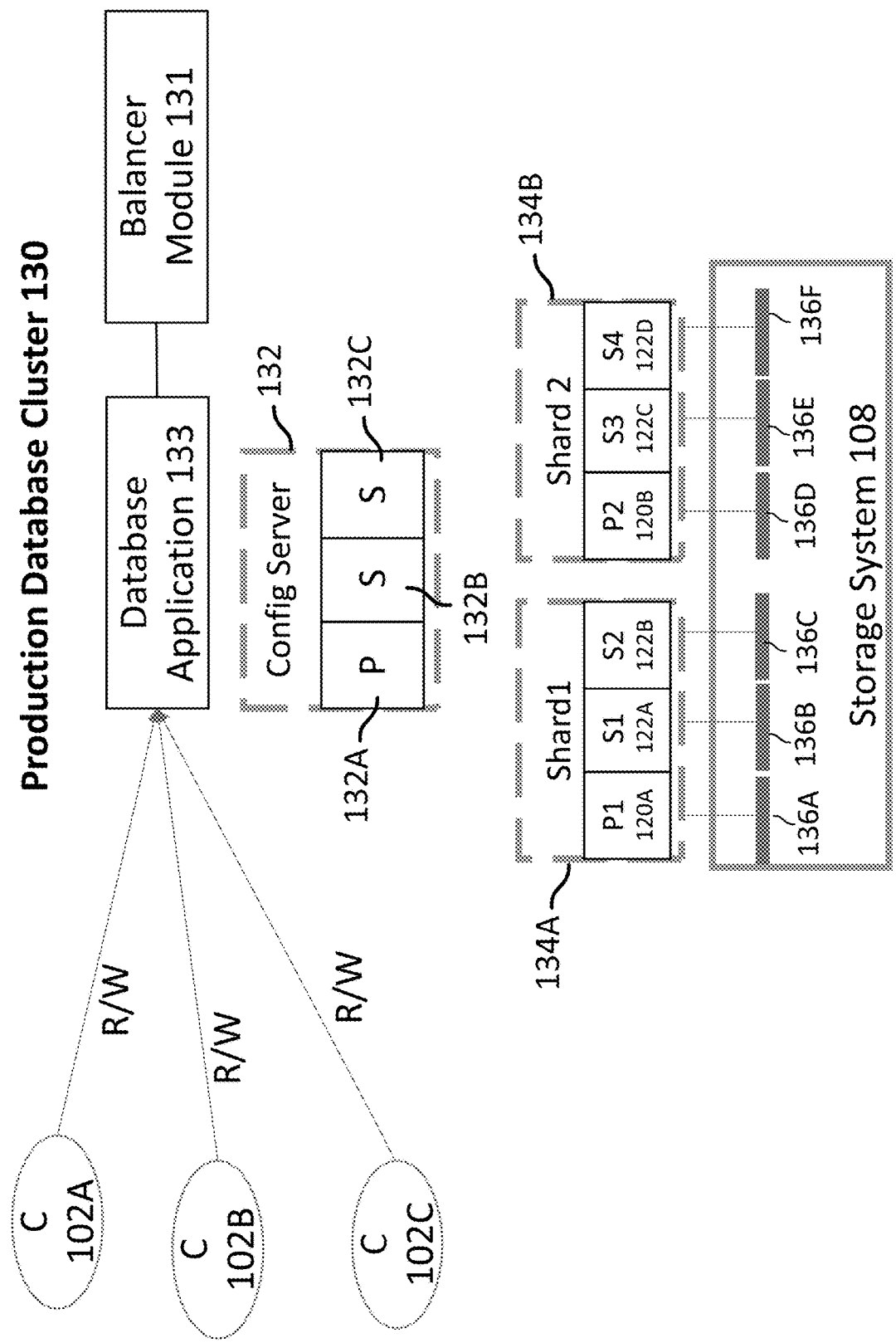
FIG. 1C shows an example of a distributed database cluster, used according to one aspect of the present disclosure.

Distributed Database Cluster 130: FIG. 1C shows an example of a distributed, production database cluster 130 (may also be referred to as cluster 130) for example, a MongoDB cluster, according to one aspect of the present disclosure. The term production as used herein means that the database is actively used by client applications to read and write data. Cluster 130 executes a database application/program 133 (similar to application 106) that receives read and write requests from clients' 102A-102C to store data to, and retrieve data from, at least one database.

Cluster 130 includes a balancer module 131 that is either part of the database application 133 or interfaces with the database application 133. The balancer module 131 is executed as a background process and is responsible for balancing database contents across shards or partitions for various cluster nodes.

Cluster 130 includes one or more configuration servers 132 (shown as "Config Server" 132) that stores metadata for the cluster 130 having a plurality of shards, e.g., 134A-134B. The metadata reflects the state and organization of data and the various components within the cluster 130. The metadata includes a list of "chunks" on every shard and the address ranges that define the chunks. The term chunk means a finite amount of storage space. The various instances of database application 133 cache the metadata and use the metadata to route read and write operations to the correct shards. The configuration information is updated when there are metadata changes for the cluster, such as adding a shard. The configuration server 132 also store authentication configuration information such as Role-Based Access Control (RBAC) or internal authentication settings for the cluster 130. The configuration server 132 may also be used to manage distributed locks.

Configuration server 132 stores multiple copies of the cluster metadata using multiple nodes 132A-132C, where node 132A operates as a primary node (shown as P"), while nodes 132B and 132C (shown as S") maintain secondary replicas of the metadata.

As an example, cluster 130 uses a first shard (Shard 1) 134A (may be referred to as Shard 134A) and a second shard Shard 2) 134B (may be referred to as Shard 134B) to store multiple copies of a database. It is noteworthy that the various aspects of the present disclosure are not limited to any specific number of shards.

Shard 1 134A maintains a primary copy of the database that is maintained by a primary node P1 120A, while secondary replicas of the same database are maintained by secondary nodes, S1 122A and S2 122, respectively. Similarly, Shard 2 134B uses a primary node, P2 120B and secondary nodes, S3 122C and S4 122D for executing multiple instances of the database application 133 and storing multiple copies of the databases within cluster 130. The primary and secondary nodes of each shard also store the operation log 123B. Each primary and secondary node is a computing device or a VM that executes an instance of database application 133 within cluster 130.

Each node is assigned to a LUN (shown as 136A-136F) within the shared storage system 108. The LUNs are used to store database replicas for each database node and the operation logs 123B. Details for backing up and restoring multiple database replicas within cluster 130 are provided below.

Figure 1D:
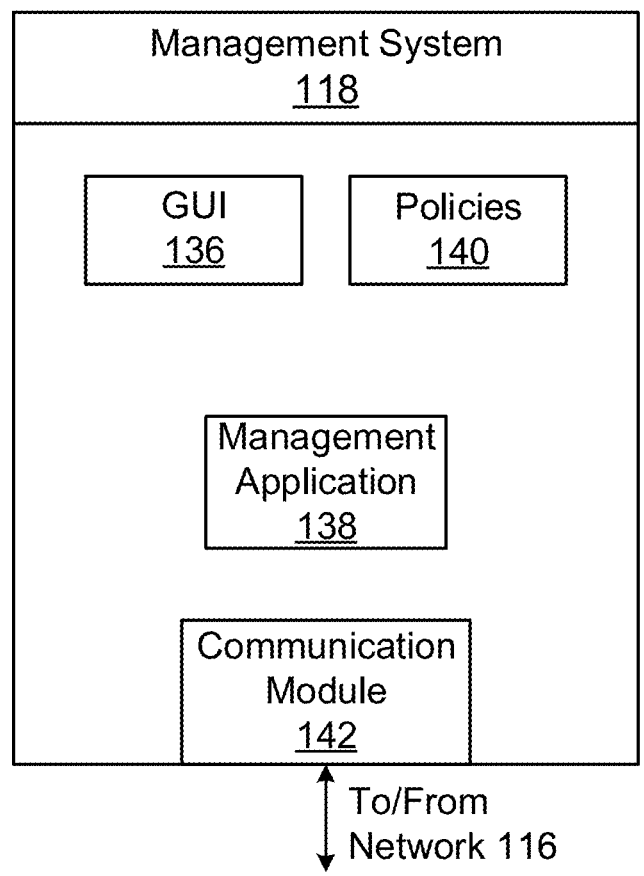
FIG. 1D shows a block diagram of a management system, used according to one aspect of the present disclosure.

Management System 118: FIG. 1D shows a block diagram of management system 118 with a management application 138, according to one aspect of the present disclosure. The various modules of management system 118 may be implemented in one computing system or in a distributed environment among multiple computing systems. For example, the management application 138 may be executed by a standalone server and/or VM.

In the illustrated aspect, the management system 118 may include a graphical user interface (GUI) module 136 to generate a GUI for use by a user. In another aspect, management system 118 may present a command line interface (CLI) to a user. The GUI may be used to receive requests to setup backup policies 140 based on which, the management application 138 executes backup and/or restore operations.

Management system 118 may also include a communication module 142 that implements one or more conventional network communication protocols and/or APIs to enable the various modules of management system 118 to communicate with the various computing nodes of cluster 130 (FIG. 1C), storage system 108, VMs 113A-113N, server system 104 and clients 102.

Management system 118 may also include other modules that are not described in detail because the details are not germane to the inventive aspects of this disclosure.

Figure 1E:
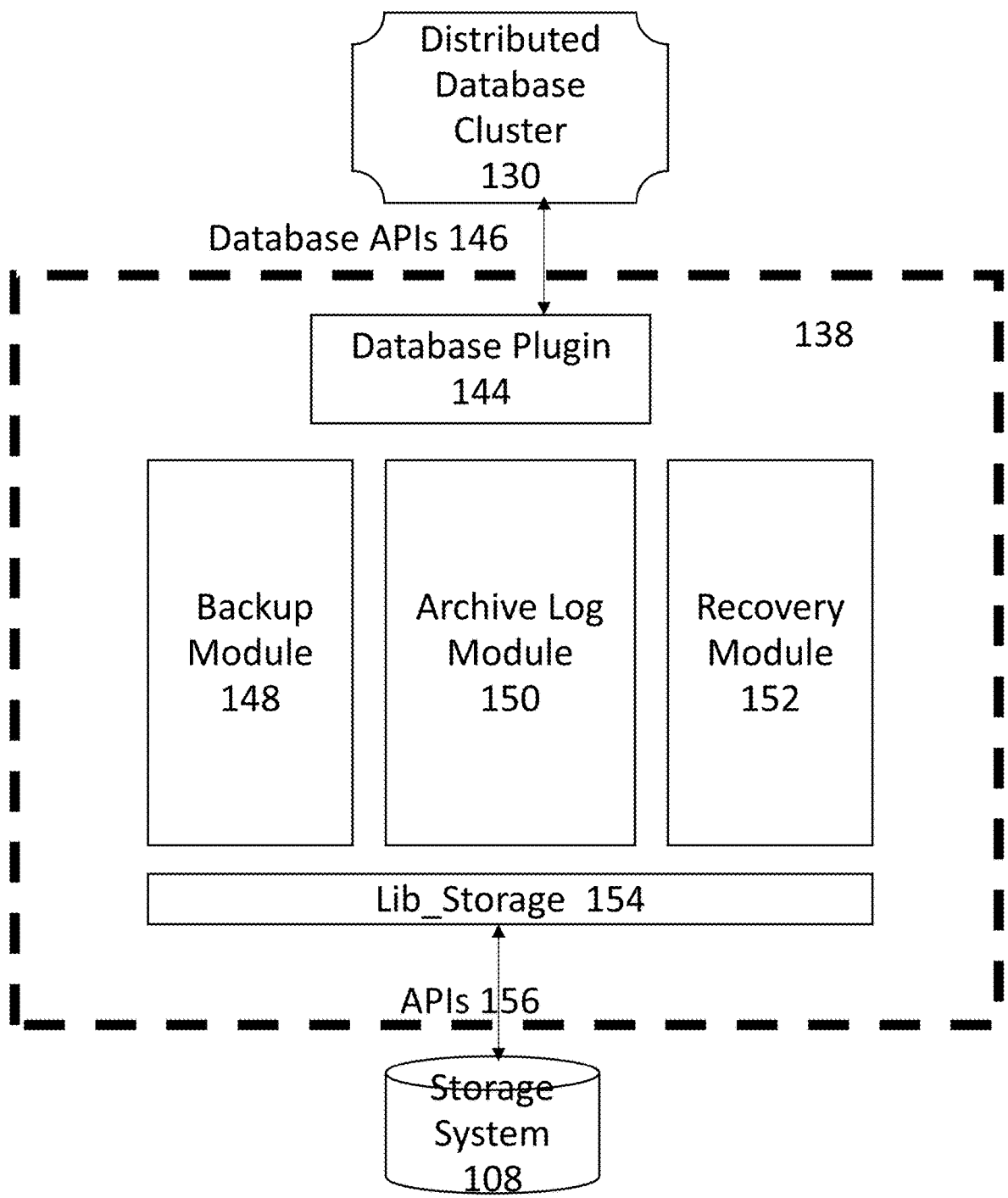
FIG. 1E is a block diagram of a management application, used according to one aspect of the present disclosure.

Management Application 138: FIG. 1E provides an example of the management application 138 interfacing with cluster 130 and the storage system 108, according to one aspect of the present disclosure. In one aspect, the management application 138 includes a backup module 148 (may be referred to as module 148), an archive log module 150 (may be referred to as module 150) and a recovery (or "restore") module 152 (may be referred to as "module 152"). Module 148 executes a backup operation, while module 150 provides continuous data protection by archiving operation logs for a plurality of shards, as described below in detail. It is noteworthy that module 150 may be implemented as an independent, processor executable utility program that can be used with or integrated with other applications. Module 152 executes a restore process, also described below in detail.

The various modules communicate with cluster 130 via database application program interfaces (APIs) 146 provided by a database plugin (may also be referred to as plugin) 144. The database plugin 144 is customized to interface and understand the structure and schema of the database cluster 130. The structure/schema of the database APIs 146 depends on the type of database. For example, MongoDB will use one set of APIs, while Oracle NoSQL may use other APIs that are accessed by plugin 144. The adaptive aspects of the present disclosure are not limited to any specific API type or format.

A storage library 154 (shown as Lib_Storage 154) stores APIs 156 that are used to communicate with the storage system 108. APIs 156 will also depend on the storage system type. For example, Zephyr APIs (ZAPIs) may be used for a cluster based storage system provided by NetApp Inc. (without derogation of any trademark rights). REST based APIs may be used for cloud based storage systems (e.g. SolidFire provided by NetApp Inc. (without derogation of any trademark rights)). REST means "Representational State Transfer", which is a scalable system used for building web services. REST based systems/interface may use HTTP (hyper-text transfer protocol) or other communication protocols for communication. The various aspects of the innovative backup and restore technology disclosed herein are not limited to any specific API format or storage system type.

Figure 1F:
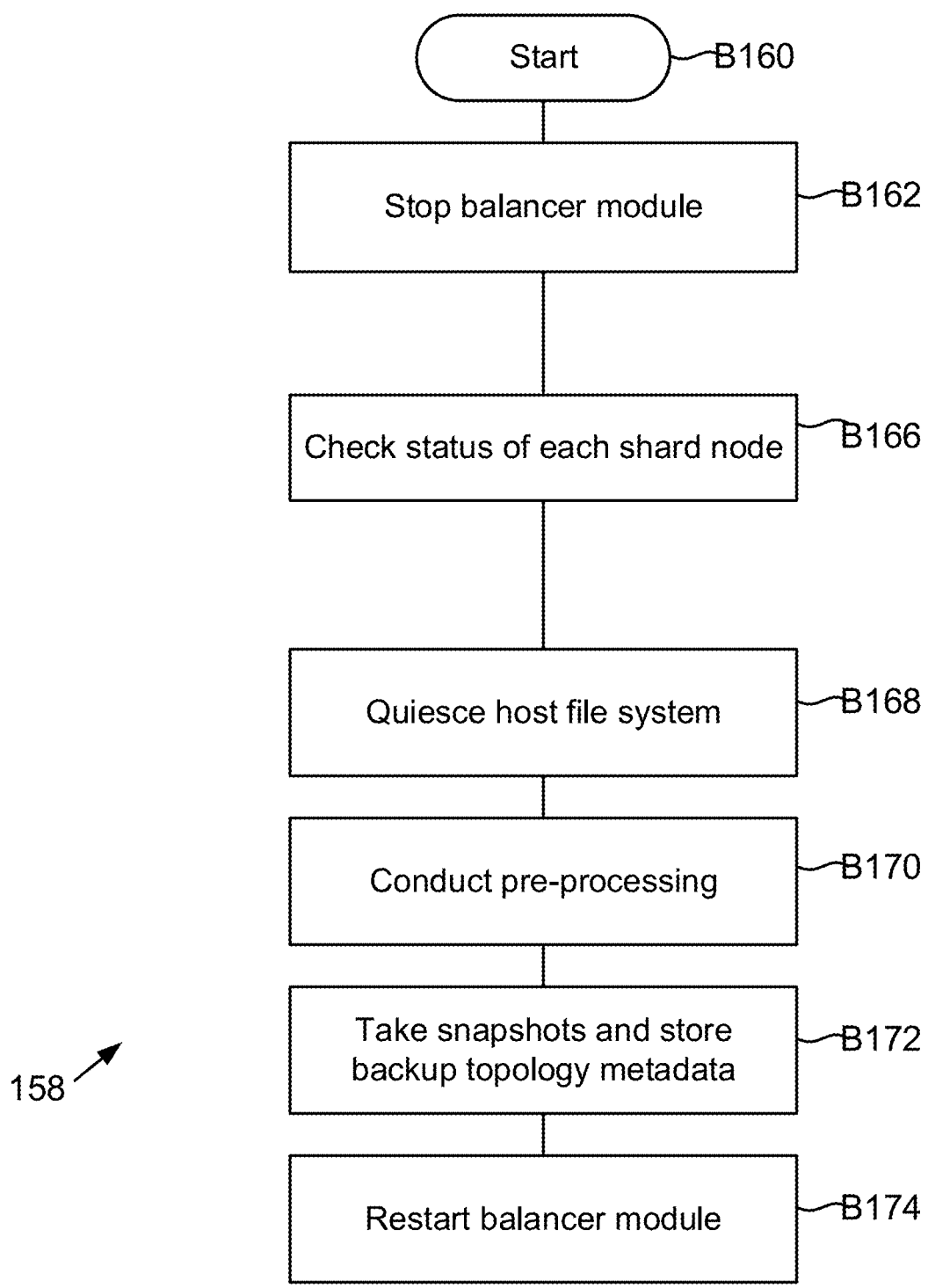
FIG. 1F shows a process flow diagram of a backup operation for a distributed database cluster, according to one aspect of the present disclosure.

Backup Process Flow: FIG. 1F shows a process flow 158 for a backup operation, according to one aspect of the present disclosure. The various process steps are executed by the management application 138 in conjunction with the storage system 108. The process begins in block B160 when the database cluster 130 is operational and is responding to client read and write requests. The configuration server 132 is also operational.

In block B162, the backup module 138 requests the balancer module 131 (FIG. 1C) to stop load balancing between primary and secondary nodes for the operational shards (e.g. 134A and 134B, FIG. 1C) in the cluster 130. The request may be sent using one or more APIs 146.

In block B166, the backup module 148 checks the status of each shard node, for example, 120A-120B and 122A-122D (as shown in FIG. 1C). The backup module 148 may send a message to configuration server 132 using one or more APIs 146 to obtain the node status. In one aspect, the configuration server 132 provides the status of each shard node whether the shard nodes are active or unavailable.

In block B168, a file system executed by the server is quiesced. In block B170, any other pre-processing that is needed is performed.

In block B172, the backup module 148 takes snapshots for each of the shard nodes including all the alive nodes of the configuration server 132. A snapshot is a "point in time" copy of the active file system that uses the storage LUNs for storing data on behalf of the database cluster nodes. The snapshot is a persistent point in time (PPT) image that enables quick recovery of data. The metadata for the snapshots is stored with the snapshots at a storage location so that it is accessible to module 152, as described below. The metadata includes a backup identifier, for example, a backup name, and list of databases that are excluded from the backup, a database cluster name, identifiers that identify the shards, an identifier that identifies the database cluster nodes (for example, the host system) that use an associated LUN, a health indicator indicating the health of the shard node at the time of the backup, LUN identifier identifying the LUN used by the node, and a snapshot identifier identifying the snapshot of the LUN.

After the snapshots are taken, the backup module 138 again captures the cluster node topology for validation to ensure that the process captures any change in topology since the backup operation was initiated. These changes may be due to hardware failure or any other type of failure. If there is a difference between the topologies before and after the snapshots, the process starts again until snapshots are captured with a stable topology, i.e. there is no change in the topology before and after the snapshots are taken. The stable topology information is stored with the backup metadata and the snapshots.

Thereafter, in block B174, the balancer module 133 is restarted to enable any user induced changes.

In one aspect, the backup operation may be performed in multiples phases. Phase 1 of the process may be used to take a crash consistent backup of various LUNs that are associated with the various replicas of the distributed database. Phase 1 is performed without quiescing the database application, i.e. the database application 133 continues to receive I/O (input/output) requests from client applications. During Phase, 1, the backup module 148 marks all cluster nodes that are "alive" i.e. operational. The backup module 148 may maintain a temporary data structure (not shown) to track the alive nodes as part of Phase 1 of the backup operation. The backup module 148 captures the existing cluster topology. The backup module 148 captures the mapping between shards and nodes, the nodes and the LUNs of the storage system 108, file system for each LUN and the database details (e.g. a database name, version, health of the various nodes or any other details).

Phase 2 performs background processing of the Phase 1 crash consistent backup and transforms the Phase 1 backup from a crash consistent state to cluster consistent state.

In one aspect, the innovative archive log management is not limited to any specific backup/snapshot technology. Any backup technology may be used in conjunction with the archive log management of the present disclosure.

Figure 1G:
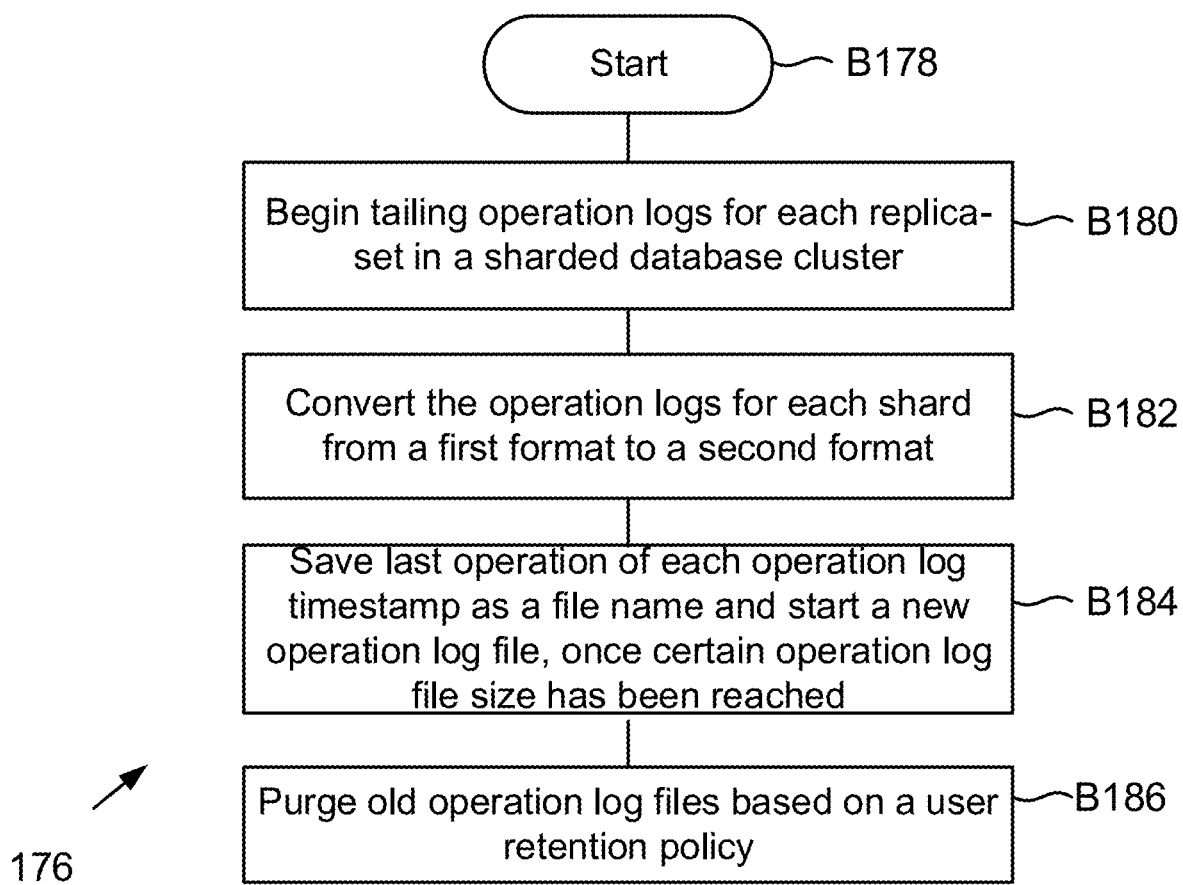
FIG. 1G shows a process flow for archive log management of a distributed database cluster, according to one aspect of the present disclosure.

Archive Log Management: FIG. 1G shows a process flow 176 for archive log management, according to one aspect of the present disclosure. Process blocks of FIG. 1G are executed by module 150 and cluster 130 components, according to one aspect of the present disclosure. Process 176 begins in block B178 before a backup schedule is initiated for cluster 130. In block B180, module 150 begins "tailing" operation logs 123B for each shard. In one aspect, the database APIs 146 include a tailing API that is used by module 150 to collect operation log entries. The operation log entries may be obtained from the primary node of a shard or a secondary node. When a primary node is used, the operation logs can be obtained immediately since the primary node caches operation log 123B. If a secondary node is selected, then there may be some delay in operation log streaming, however, the read overhead to obtain the operation log from a secondary node will be less than the primary node because secondary nodes tend to have lower workload.

In block B182, the operation log entries are converted from a first format to a second format. The second format is the format that is used by the database application. As an example, the first format may be the JSON format and the second format may be the BSON format.

In block B184, after the operation log file has reached a certain size. The log file is saved with the timestamp of the last entry as part of the operation log file name. The timestamp in the file name assists in a restore operation, as described below in detail. Once the operation log file is saved, a new operation log file is started.

In one aspect, the operation log file size is a function of a client's RTO. The process ensures that if an entire log file has to be replayed, then it meets the RTO duration requirements. For example, if the operation log file size reaches Y GB and it takes Y GB to be replayed longer than an hour, the RTO for a client, then the snapshot based backup is triggered prior to log file reaching Y GB. Since snapshot based backup can be restored instantaneously, the system can save on replay time of logs during point-in-time restore by replaying fewer than Y GB of logs to meet application RTO. This is performed dynamically by module 150 that has access to RTO requirements, tracks the operation log file size and the time it takes to replay the log file.

In block B186, old operation log files are purged based on user retention policies. For example, if a client has a policy to have a point in time restore going back 10 days, then any operation logs before 10 days are purged.

Figure 1H:
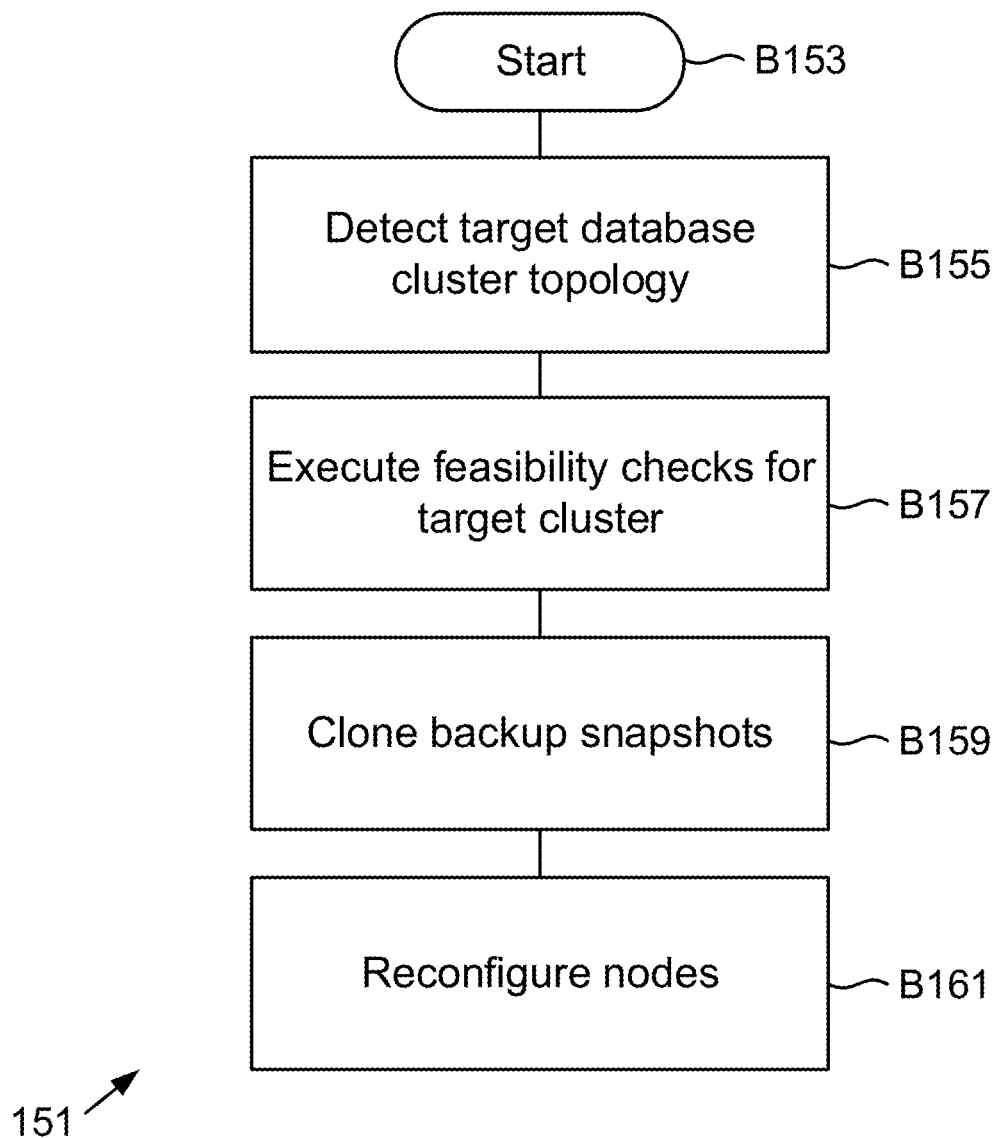
FIG. 1H shows a restore process for a distributed database cluster, according to one aspect of the present disclosure.
Figure 1I:
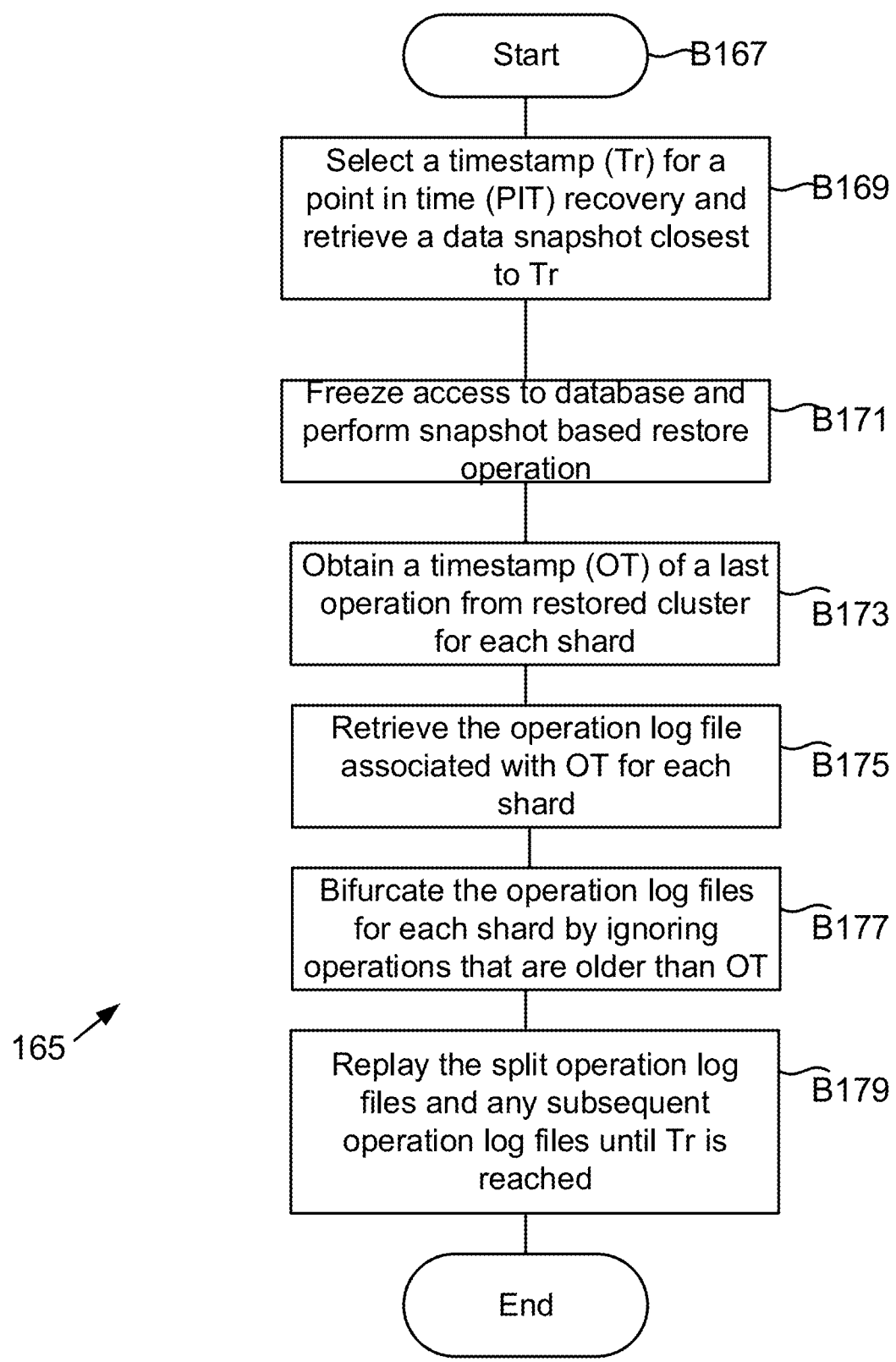
FIG. 1I shows an example of a process using archive log management, according to one aspect of the present disclosure.
Figure 1J:
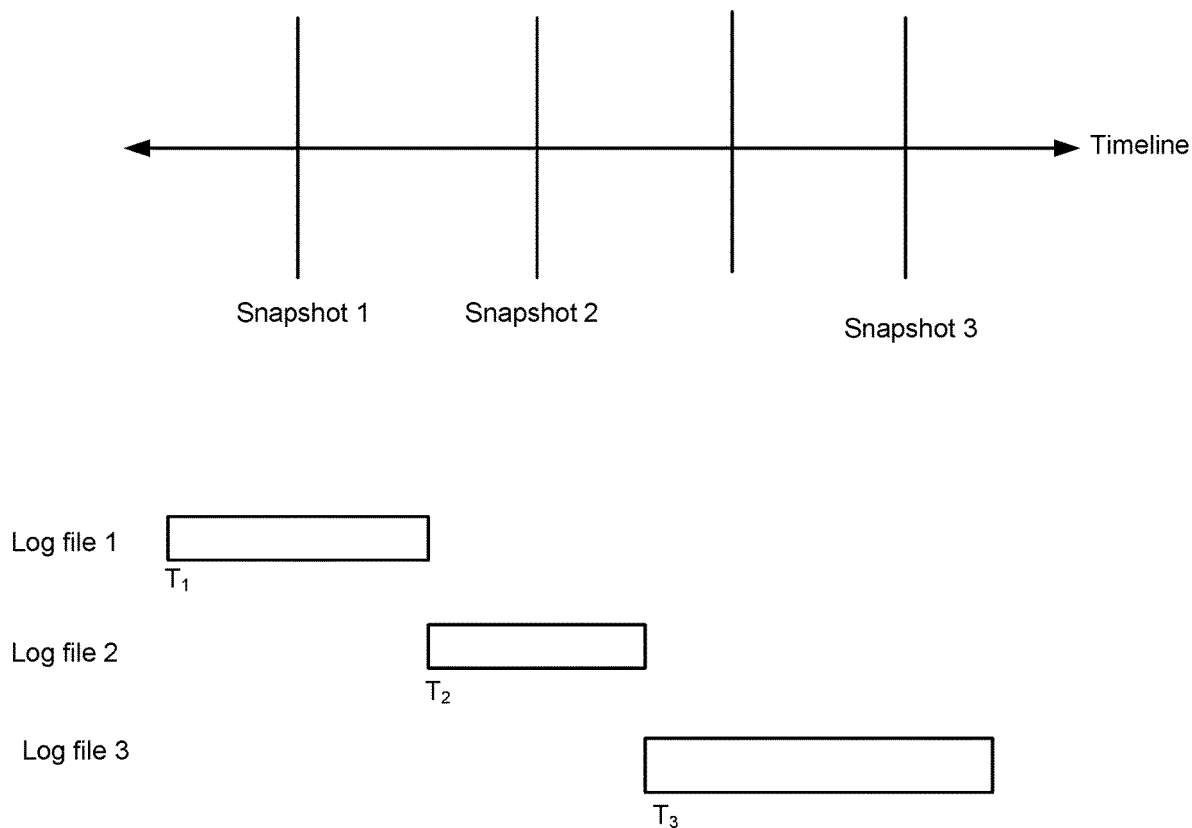
FIG. 1J shows an example of the backup process of FIG. 1F, according to one aspect of the present disclosure.

FIG. 1J shows an example of executing process flows of FIGS. 1F and 1G. Before the first snapshot is taken at time, the log file 1 is started at time T1. Log files 2 and 3 begin at time T2 and T3, respectively.

Restore Process Flows: FIG. 1H shows a restore process 151, according to one aspect of the present disclosure. In one aspect, the restore cluster topology may not be the same as the production database cluster topology i.e. the restore cluster topology may have more or fewer nodes than the production database cluster. When the number of shards in the restore cluster are the same as production database cluster, then the snapshot for the primary node can be cloned and made available to the database application. If there is more than one node within the shards, then the snapshot of the primary node may be cloned for various secondary nodes.

When the number of shards in the restore cluster are different from the number of shards in the backed up topology, then the shards can be added or removed to match the backed up topology.

The process begins in block B153. In block B155, module 152 first detects the target cluster topology. Module 152 also performs a feasibility check for a target cluster (not shown) in block B157. This ensures that the target cluster shards have the same identifiers as the production cluster shards 134A and 134B.

In block B159, the snapshots of the primary nodes are cloned for the primary and secondary nodes of the target cluster. The cloned snapshots are reconfigured to match the target cluster topology in block B161. It is noteworthy that cloning snapshots is faster and more efficient than copying all the data for different nodes. Thereafter, the target cluster is ready for testing and deployment.

Figure 1K:
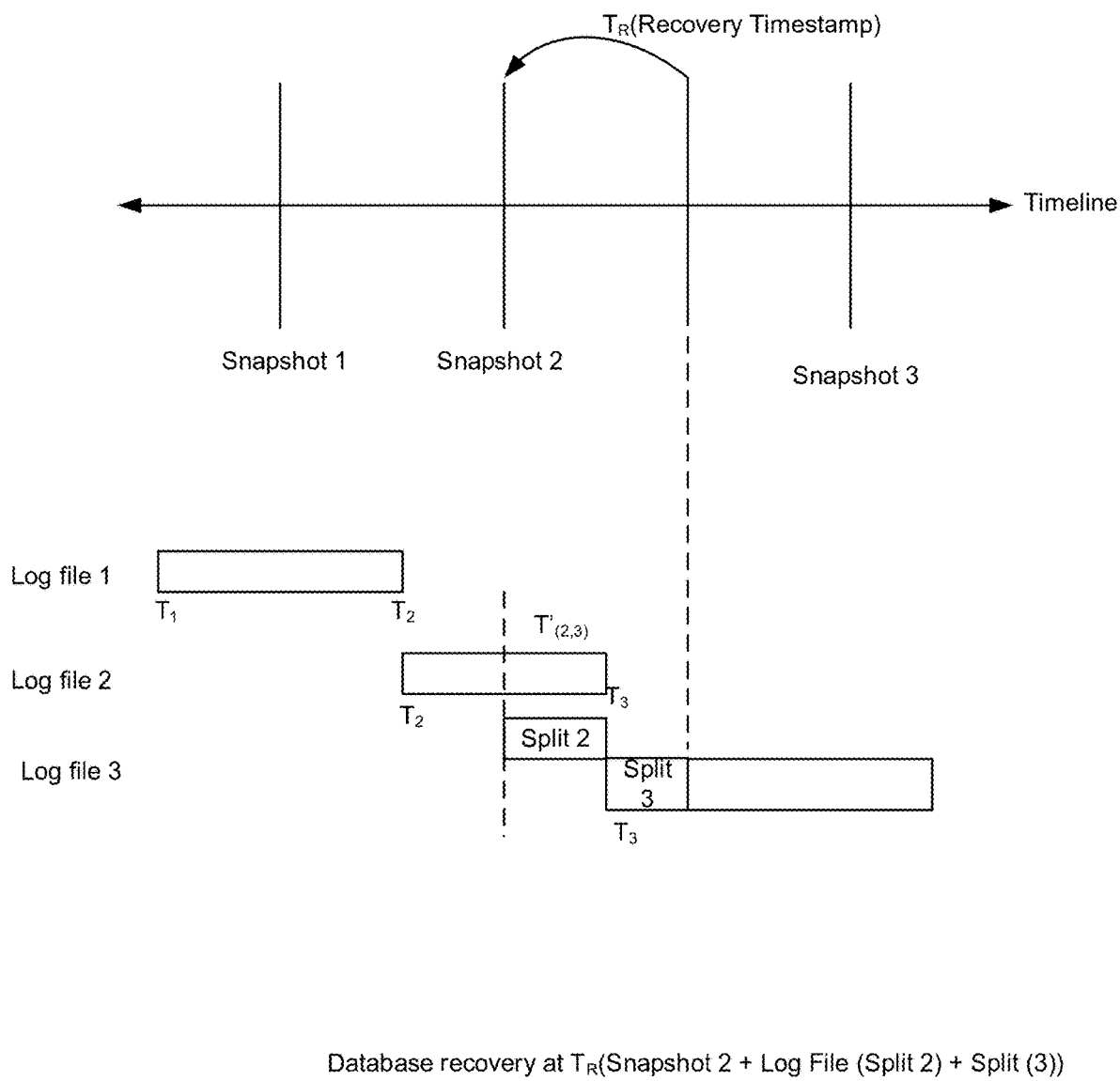
FIG. 1K shows an example of a restore process of FIG. 1I, according to one aspect of the present disclosure.

FIG. 1I shows a process flow 165 using the operation logs collected in FIG. 1G, described above in detail. Process 165 begins when at least one snapshot copy of the database is available. In block B169, a user may provide a certain timestamp, Tr, for performing a point in time recovery operation. Based on the timestamp, the process selects an appropriate snapshot for the restore operation. FIG. 1K shows an example of block B169. The user provided timestamp is shown as Tr and snapshot 2 is selected for the restore operation.

In block B171, access to the database at each shard member is frozen. A snapshot restore process as described in FIG. 1H is then performed. The restore may be volume based restore or single restore for LUNs. The database cluster is then mounted and brought up.

In block B173, the timestamp ("OT") of a last operation for each shard is retrieved from the restored snapshot. In block B175, the operation log file associated with the timestamp is located. This is shown in FIG. 1K as the log file 2. For each shard, the operation log files are split such that operations before OT are ignored. The split log file 2 is shown as "split 2" in FIG. 1K. Log file 3 is also split (shown as "Split 3") to include all records prior to timestamp Tr.

In block B179, the split operation log files are replayed by the database application. Since the log files are in the same format as the database application, the replay does not require any conversion.

In one aspect, methods and systems for a distributed database cluster storing a plurality of replicas of a databases are provided. One method includes locating by a processor, a timestamp of a last stored record in a backup copy of the database from a plurality of logical partitions for a point in time restore operation; identifying by the processor, an operation log for each logical partition with the last stored record, the operation log providing transaction details associated with the database; splitting by the processor, the operation log for each logical partition by ignoring transactions that occurred prior to the timestamp of the last stored record; and using by the processor, the split operation log for restoring the database to the point in time.

The innovative technology described herein provides low RTO and RPO for client systems while providing continuous data protection for a point in time recovery. Since snapshots and split operation logs between snapshots are used, the recovery time is minimal. Furthermore, since operation timestamp recovery is used, the RPO is also low. The size of the operation logs retrieved and stored by module 150 may vary based on client RTO.

Clustered Storage System: FIG. 2A depicts an illustrative aspect of a shared, storage environment 200 used by the database cluster 130. The shared, storage environment 200 includes a plurality of server systems 204.1-204.2 (similar to server systems 104), a clustered storage system 202 and at least one computer network 206 communicably connecting the server systems 204.1-204.2 and the clustered storage system 202.

The clustered storage system 202 includes a plurality of nodes 208.1-208.3, a cluster switching fabric 210, and a plurality of mass storage devices 212.1-212.3 (similar to 110, FIG. 1A). Each of the plurality of nodes 208.1-208.3 is configured to include a network module, a storage module, and a management module, each of which can be implemented as a separate processor executable or machine implemented module. Specifically, node 208.1 includes a network module 214.1, a storage module 216.1, and a management module 218.1, node 208.2 includes a network module 214.2, a storage module 216.2, and a management module 218.2, and node 208.3 includes a network module 214.3, a storage module 216.3, and a management module 218.3. It is noteworthy that the storage system 202 nodes are different and separate from the distributed database cluster nodes described above.

The network modules 214.1-214.3 include functionality that enables the respective nodes 208.1-208.3 to connect to one or more of the client systems 204.1-204.2 over the computer network 206, while the storage modules 216.1-216.3 connect to one or more of the storage devices 212.1-212.3.

The management modules 218.1-218.3 provide management functions for the clustered storage system 202. Accordingly, each of the plurality of server nodes 208.1-208.3 in the clustered storage server arrangement provides the functionality of a storage server.

A switched virtualization layer including a plurality of virtual interfaces (VIFs) 220 is provided below the interface between the respective network modules 214.1-214.3 and the client systems 204.1-204.2, allowing storage 212.1-212.3 associated with the nodes 208.1-208.3 to be presented to the client systems 204.1-204.2 as a single shared storage pool. For example, the switched virtualization layer may implement a virtual interface architecture. FIG. 2A depicts only the VIFs 220 at the interfaces to the network modules 214.1, 214.3 for clarity of illustration.

The clustered storage system 202 can be organized into any suitable number of virtual servers (VServer or storage virtual machines (SVM)) 222A-222N, in which each virtual storage system represents a single storage system namespace with separate network access. Each virtual storage system has a user domain and a security domain that are separate from the user and security domains of other virtual storage systems. Server systems 204 can access storage space via a VServer from any node of the clustered system 202.

Each of the nodes 208.1-208.3 may be defined as a computer adapted to provide application services to one or more of the client systems 204.1-204.2. In this context, a SVM is an instance of an application service provided to a client system. The nodes 208.1-208.3 are interconnected by the switching fabric 210, which, for example, may be embodied as a Gigabit Ethernet switch or any other switch type.

Figure 2A:
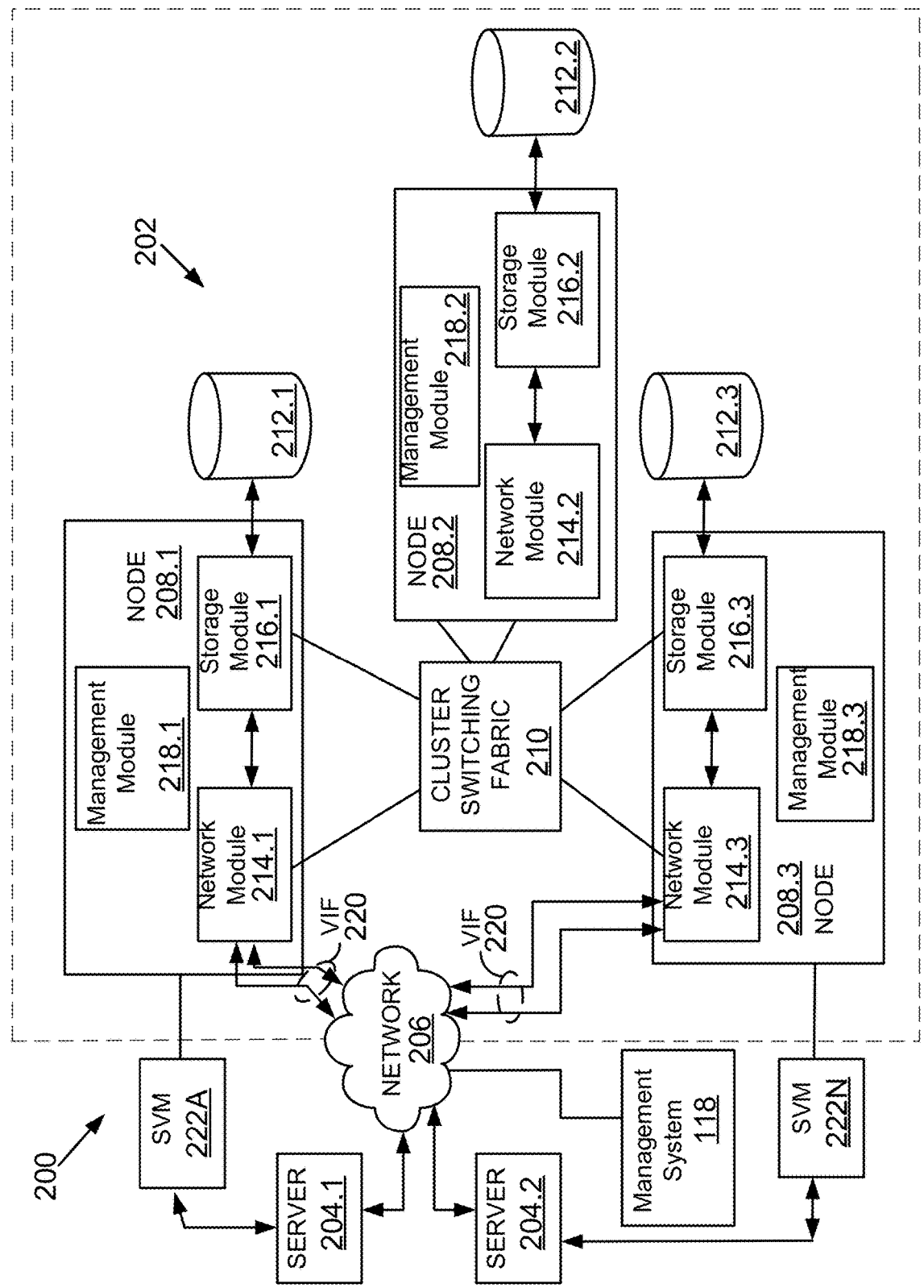
FIG. 2A shows an example of a clustered storage system, according to one aspect of the present disclosure.

Although FIG. 2A depicts three network modules 214.1-214.3, the storage modules 216.1-216.3, and the management modules 218.1-218.3, any other suitable number of network modules, storage modules, and management modules may be provided. There may also be different numbers of network modules, storage modules, and/or management modules within the clustered storage system 202. For example, in alternative aspects, the clustered storage system 202 may include a plurality of network modules and a plurality of storage modules interconnected in a configuration that does not reflect a one-to-one correspondence between the network modules and storage modules.

The server systems 204.1-204.2 of FIG. 2A may be implemented as computing devices configured to interact with the respective nodes 208.1-208.3 in accordance with a client/server model of information delivery. In the presently disclosed aspect, the interaction between the server systems 204.1-204.2 and the nodes 208.1-208.3 enable the provision of network data storage services. Specifically, each server system 204.1, 204.2 may request the services of one of the respective nodes 208.1, 208.2, 208.3, and that node may return the results of the services requested by the client system by exchanging packets over the computer network 206, which may be wire-based, optical fiber, wireless, or any other suitable combination thereof. The server systems 204.1-204.2 may issue packets according to file-based access protocols, such as the NFS or CIFS protocol, when accessing information in the form of files and directories.

In a typical mode of operation, one of the server systems 204.1-204.2 transmits an NFS or CIFS request for data to one of the nodes 208.1-208.3 within the clustered storage system 202, and the VIF 220 associated with the respective node receives the client request. It is noted that each VIF 220 within the clustered system 202 is a network endpoint having an associated IP address. The server request typically includes a file handle for a data file stored in a specified volume on at storage 212.1-212.3.

Figure 2B:
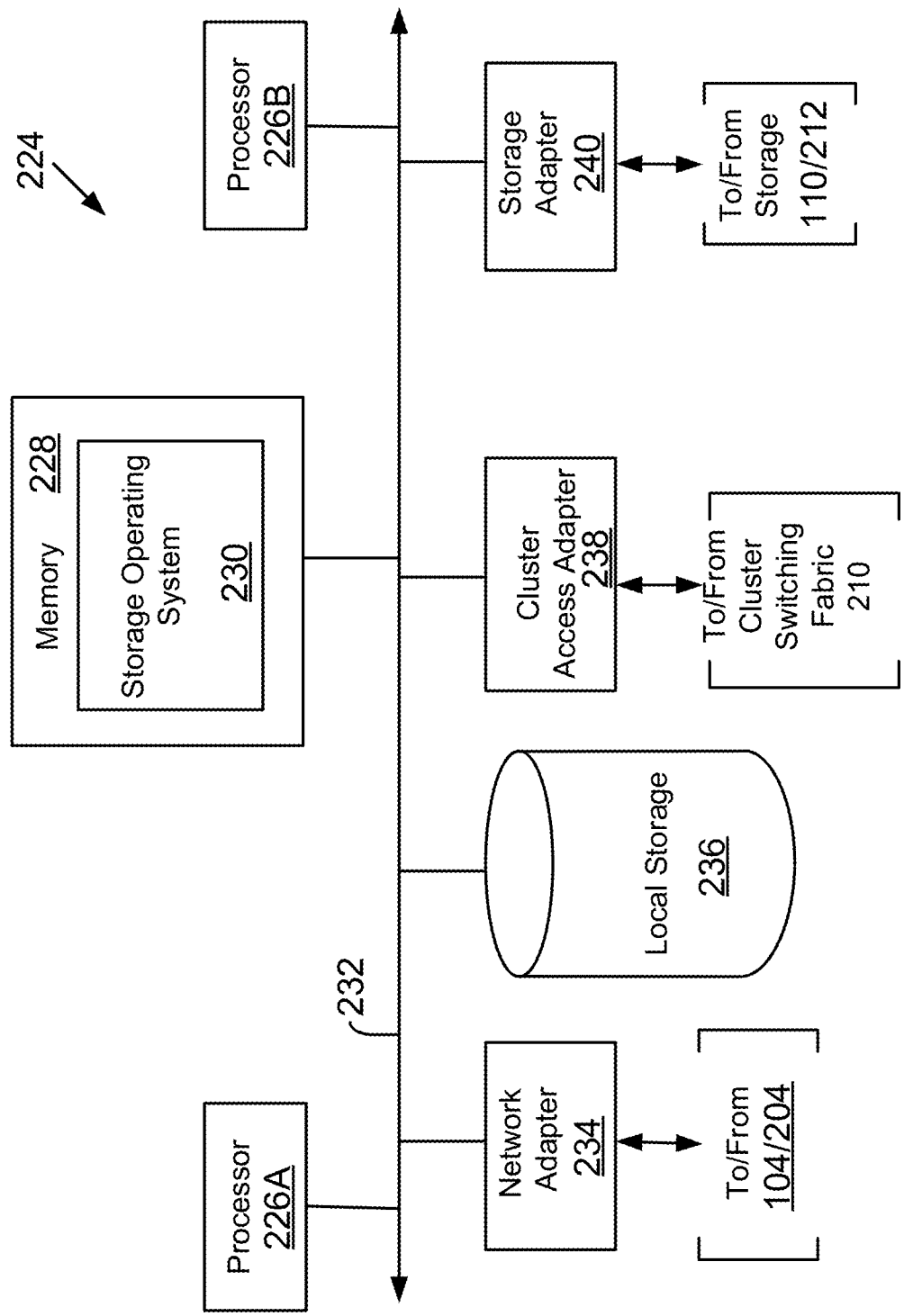
FIG. 2B shows an example of a storage system node, used according to one aspect of the present disclosure.

Storage System Node: FIG. 2B is a block diagram of a computing system 224, according to one aspect. System 224 may be used by a stand-alone storage system 108 and/or a storage system node operating within a cluster based storage system described above with respect to FIG. 2A.

System 224 may include a plurality of processors 226A and 226B, a memory 228, a network adapter 234, a cluster access adapter 238 (used for a cluster environment), a storage adapter 240 and local storage 236 interconnected by a system bus 232. The local storage 236 comprises one or more storage devices, such as disks, utilized by the processors to locally store configuration and other information.

The cluster access adapter 238 comprises a plurality of ports adapted to couple system 224 to other nodes of a cluster as described above with respect to FIG. 2A. In the illustrative aspect, Ethernet may be used as the clustering protocol and interconnect media, although it will be apparent to those skilled in the art that other types of protocols and interconnects may be utilized within the cluster architecture described herein.

System 224 is illustratively embodied as a dual processor storage system executing a storage operating system 230 that preferably implements a high-level module, such as a file system, to logically organize information as a hierarchical structure of named directories, files and special types of files called virtual disks (hereinafter generally "blocks") on storage devices 110/212. However, it will be apparent to those of ordinary skill in the art that the system 224 may alternatively comprise a single or more than two processor systems. Illustratively, one processor 226 executes the functions of a network module on a node, while the other processor 226B executes the functions of a storage module.

The memory 228 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions described herein.

The storage operating system 230, portions of which is typically resident in memory and executed by the processing elements, functionally organizes the system 224 by, inter alia, invoking storage operations in support of the storage service provided by storage system 108. An example of operating system 230 is the DATA ONTAP® (Registered trademark of NetApp, Inc. operating system available from NetApp, Inc. that implements a Write Anywhere File Layout (WAFL® (Registered trademark of NetApp, Inc.)) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

The network adapter 234 comprises a plurality of ports adapted to couple the system 224 to one or more server systems over point-to-point links, wide area networks, virtual private networks implemented over a public network (Internet) or a shared local area network. The network adapter 234 thus may comprise the mechanical, electrical and signaling circuitry needed to connect storage system 108 to the network. Illustratively, the computer network may be embodied as an Ethernet network or a FC network.

The storage adapter 240 cooperates with the storage operating system 230 executing on the system 224 to access information requested by the server systems 104 and management system 118 (FIG. 1A). The information may be stored on any type of attached array of writable storage device media such as video tape, optical, DVD, magnetic tape, bubble memory, electronic random access memory, flash memory devices, micro-electro mechanical and any other similar media adapted to store information, including data and parity information.

The storage adapter 240 comprises a plurality of ports having input/output (I/O) interface circuitry that couples to the disks over an I/O interconnect arrangement, such as a conventional high-performance, FC link topology.

In another aspect, instead of using a separate network and storage adapter, a converged adapter is used to process both network and storage traffic.

Figure 3:
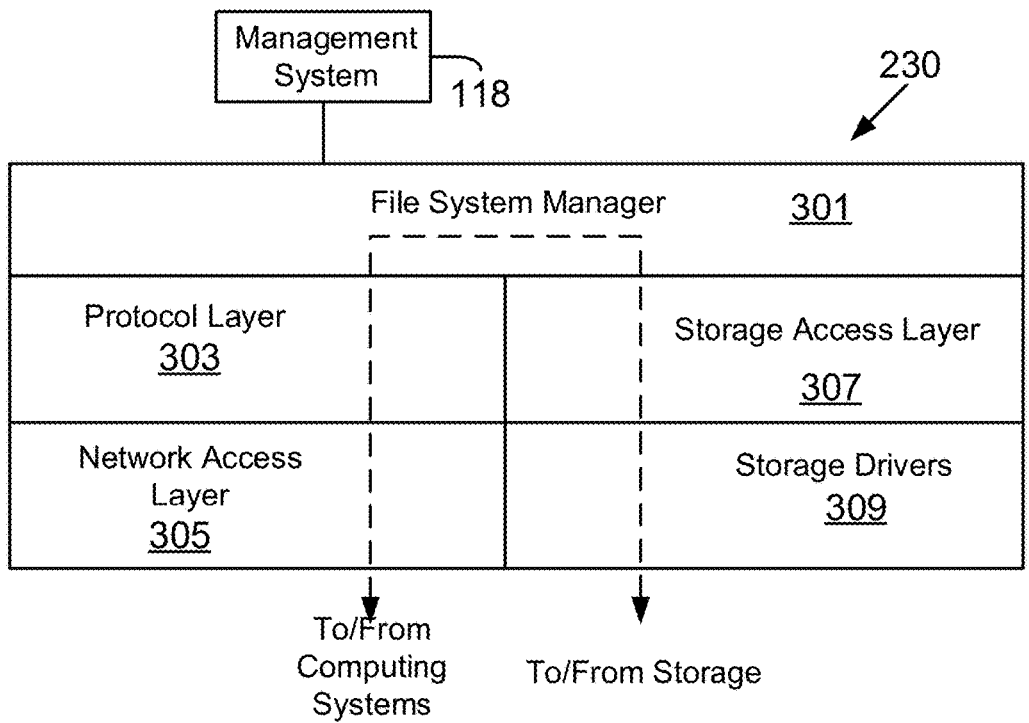
FIG. 3 shows an example of a storage operating system, used according to one aspect of the present disclosure.

Operating System: FIG. 3 illustrates a generic example of operating system 230 executed by storage system 108, according to one aspect of the present disclosure. Storage operating system 230 interfaces with the management system 118 for backing up and cloning LUNs, described above in detail.

As an example, operating system 230 may include several modules, or "layers". These layers include a file system manager 303 that keeps track of a directory structure (hierarchy) of the data stored in storage devices and manages read/write operations, i.e. executes read/write operations on disks in response to server system 104 requests.

Operating system 230 may also include a protocol layer 303 and an associated network access layer 305, to allow system 200 to communicate over a network with other systems, such as server system 104 and management system 118. Protocol layer 303 may implement one or more of various higher-level network protocols, such as NFS, CIFS, Hypertext Transfer Protocol (HTTP), TCP/IP and others, as described below.

Network access layer 305 may include one or more drivers, which implement one or more lower-level protocols to communicate over the network, such as Ethernet. Interactions between server systems 104 and mass storage devices 110/212 are illustrated schematically as a path, which illustrates the flow of data through operating system 230.

The operating system 230 may also include a storage access layer 307 and an associated storage driver layer 309 to communicate with a storage device. The storage access layer 307 may implement a higher-level disk storage protocol, such as RAID (redundant array of inexpensive disks), while the storage driver layer 309 may implement a lower-level storage device access protocol, such as FC or SCSI.

It should be noted that the software "path" through the operating system layers described above needed to perform data storage access for a client request may alternatively be implemented in hardware. That is, in an alternate aspect of the disclosure, the storage access request data path may be implemented as logic circuitry embodied within a field programmable gate array (FPGA) or an ASIC. This type of hardware implementation increases the performance of the file service provided by storage system 108.

As used herein, the term "storage operating system" generally refers to the computer-executable code operable on a computer to perform a storage function that manages data access and may implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a disk assembly directly-attached to a client or host computer. The term "storage system" should therefore be taken broadly to include such arrangements in addition to any subsystems configured to perform a storage function and associated with other equipment or systems.

Figure 4:
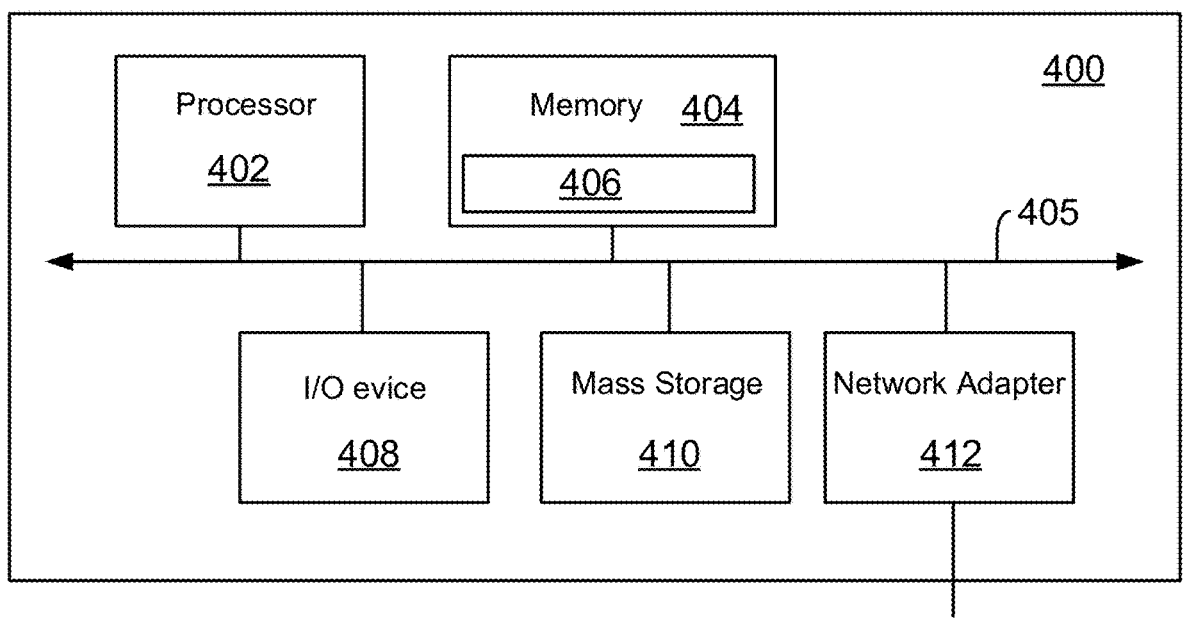
FIG. 4 shows an example of a processing system, used according to one aspect of the present disclosure.

Processing System: FIG. 4 is a high-level block diagram showing an example of the architecture of a processing system, at a high level, in which executable instructions as described above can be implemented. The processing system 400 can represent modules of management system 118, user console 102, server systems 104 and others. Note that certain standard and well-known components which are not germane to the present invention are not shown in FIG. 4.

The processing system 400 includes one or more processors 402 and memory 404, coupled to a bus system 405. The bus system 405 shown in FIG. 4 is an abstraction that represents any one or more separate physical buses and/or point-to-point connections, connected by appropriate bridges, adapters and/or controllers. The bus system 405, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 402 are the central processing units (CPUs) of the processing system 400 and, thus, control its overall operation. In certain aspects, the processors 402 accomplish this by executing programmable instructions stored in memory 404. A processor 402 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 404 represents any form of random access memory (RAM), read-only memory (ROM), flash memory, or the like, or a combination of such devices. Memory 404 includes the main memory of the processing system 400. Instructions 406 which implements techniques introduced above may reside in and may be executed (by processors 402) from memory 404. For example, instructions 406 may include code used by the backup module 138 as well as instructions for executing the process blocks of FIGS. 1F, 1G, 1H and 1I.

Also connected to the processors 402 through the bus system 405 are one or more internal mass storage devices 410, and a network adapter 412. Internal mass storage devices 410 may be or may include any conventional medium for storing large volumes of data in a non-volatile manner, such as one or more magnetic or optical based disks. The network adapter 412 provides the processing system 400 with the ability to communicate with remote devices (e.g., storage servers) over a network and may be, for example, an Ethernet adapter, a FC adapter, or the like. The processing system 400 also includes one or more input/output (I/O) devices 408 coupled to the bus system 405. The I/O devices 408 may include, for example, a display device, a keyboard, a mouse, etc.

Cloud Computing: The system and techniques described above are applicable and useful in the upcoming cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer, is a cloud platform and cloud infrastructure, followed by a "server" layer that includes hardware and computer software designed for cloud specific services. The management system 118 (and associated methods thereof) and storage systems described above can be a part of the server layer for providing storage services. Details regarding these layers are not germane to the inventive aspects.

Thus, methods and systems for archive log management for distributed databases have been described. Note that references throughout this specification to "one aspect" or "an aspect" mean that a particular feature, structure or characteristic described in connection with the aspect is included in at least one aspect of the present invention. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the present disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method for a distributed database cluster storing a plurality of replicas of a database, comprising;

modifying, by a processor, a target cluster topology to match a production cluster topology in the distributed database cluster for a restore operation for restoring the database to a point in time, when the target cluster topology is different from the production cluster topology, the production cluster topology having a plurality of logical partitions for storing a primary replica and a secondary replica of the database;

locating, by a processor for the restore operation, a timestamp of a last stored record in a backup copy of the database from the plurality of logical partitions, the backup copy selected based on a recovery time stamp;

identifying, by the processor for the restore operation, an operation log for each logical partition with the last stored record, the operation log providing transaction details associated with the database;

splitting, by the processor for the restore operation, the operation log for each logical partition, the split operation log having transactions that occurred between the timestamp of the last stored record and the recovery time stamp; and using, by the processor, the split operation log for restoring the database to the point in time.

2. The method of claim 1, wherein each logical partition has a primary computing node and a secondary computing node for storing the plurality of replicas of the database.

3. The method of claim 1, further comprising: monitoring, by the processor, a size of the operation log for each logical partition, and when the size indicates that a recovery point objective to restore the database for a user will be breached, storing the operation log with a timestamp included in a name of the operation log.

4. The method of claim 3, further comprising: initiating, by the processor, a backup of the database, after the operation log is saved.

5. The method of claim 3, further comprising: initiating, by the processor, the operation log for each logical partition, before generating any backup of the database.

6. The method of claim 1, wherein modifying the target cluster topology includes matching logical partitions in the target cluster topology with logical partitions of the production database cluster, the production cluster topology having the plurality of logical partitions for storing a primary replica and a secondary replica of the database.

7. The method of claim 1, further comprising: converting the operation log received from each logical partition in a first format to a second format, before being stored by a storage system.

8. A non-transitory, machine-readable storage medium having stored thereon instructions for performing a method for a distributed database cluster storing a plurality of replicas for a database, comprising machine executable code which when executed by at least one machine, causes the machine to:
- locate a timestamp of a last stored record in a backup copy of the database from a plurality of logical partitions for a restore operation to restore the database to a point in time, the backup copy selected based on a recovery time stamp;
- identify for the restore operation, an operation log for each logical partition with the last stored record, the operation log providing transaction details associated with the database;
- split for the restore operation, the operation log for each logical partition, the split operation log having transactions that occurred between the timestamp of the last stored record and the recovery time stamp; and
- use the split operation log for restoring the database to the point in time.

9. The non-transitory storage medium of claim 8, wherein each logical partition has a primary computing node and a secondary computing node for storing the plurality of replicas of the database.

10. The non-transitory storage medium of claim 8, wherein the machine executable code further causes the machine to: monitor a size of the operation log for each logical partition, and when the size indicates that a recovery point objective to restore the database for a user will be breached, store the operation log with a timestamp included in a name of the operation log.

11. The non-transitory storage medium of claim 10, wherein the machine executable code further causes the machine to: initiate a backup of the database, after the operation log is saved.

12. The non-transitory storage medium of claim 10, wherein the machine executable code further causes the machine to: initiate the operation log for each logical partition, before generating any backup of the database.

13. The non-transitory storage medium of claim 8, wherein the machine executable code further causes the machine to: modify a target cluster topology to match a production cluster topology in the distributed database cluster for the restore operation, when the target cluster topology is different from the production cluster topology.

14. The non-transitory storage medium of claim 8, wherein the machine executable code further causes the machine to: convert the operation log received from each logical partition in a first format to a second format, before being stored by a storage system.

15. A system, comprising:
- a memory containing machine readable medium comprising machine executable code having stored thereon instructions; and a processor coupled to the memory to execute the machine executable code to:
- locate a timestamp of a last stored record in a backup copy of a database from a plurality of logical partitions for a restore operation to restore the database to a point in time, the backup copy selected based on a recovery time stamp, the database stored in a distributed database cluster that stores a plurality of replicas of the database;
- identify for the restore operation, an operation log for each logical partition with the last stored record, the operation log providing transaction details associated with the database;
- split for the restore operation, the operation log for each logical partition, the split operation log having transactions that occurred between the timestamp of the last stored record and the recovery time stamp; and
- replay transactions of the split operation log for restoring the database to the point in time.

16. The system of claim 15, wherein each logical partition has a primary computing node and a secondary computing node for storing the plurality of replicas of the database.

17. The of claim 15, wherein the machine executable code further causes to: monitor a size of the operation log for each logical partition, and when the size indicates that a recovery point objective to restore the database for a user will be breached, store the operation log with a timestamp included in a name of the operation log.

18. The system of claim 17, wherein the machine executable code further causes to: initiate a backup of the database after the operation log is saved.

19. The system of claim 15, wherein the machine executable code further causes to: modify a target cluster topology to match a production cluster topology in the distributed database cluster for the restore operation, when the target cluster topology is different from the production cluster topology, the production cluster topology having the plurality of logical partitions for storing a primary replica and a secondary replica of the database.

20. The system of claim 15, wherein the machine executable code further causes to: convert the operation log received from each logical partition in a first format to a second format, before being stored by a storage system.

* * * * *